United States Patent
Wynn et al.

(10) Patent No.: US 11,949,115 B2
(45) Date of Patent: Apr. 2, 2024

(54) MULTI-PART BATTERY MODULE WALL

(71) Applicant: Rivian IP Holdings, LLC, Plymouth, MI (US)

(72) Inventors: Nathaniel Wynn, Tustin, CA (US); Kyle Butterfield, Rancho Santa Margarita, CA (US); Tyler Jacobs, Redondo Beach, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 31 days.

(21) Appl. No.: 17/107,164

(22) Filed: Nov. 30, 2020

(65) Prior Publication Data

US 2022/0173469 A1 Jun. 2, 2022

(51) Int. Cl.

| | |
|---|---|
| *H01M 50/207* | (2021.01) |
| *H01M 10/613* | (2014.01) |
| *H01M 10/625* | (2014.01) |
| *H01M 10/6554* | (2014.01) |
| *H01M 50/233* | (2021.01) |
| *H01M 50/244* | (2021.01) |
| *H01M 50/249* | (2021.01) |
| *H01M 50/296* | (2021.01) |

(52) U.S. Cl.
CPC ....... *H01M 50/207* (2021.01); *H01M 10/613* (2015.04); *H01M 10/625* (2015.04); *H01M 10/6554* (2015.04); *H01M 50/233* (2021.01); *H01M 50/244* (2021.01); *H01M 50/249* (2021.01); *H01M 50/296* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 10,112,470 B2 | 10/2018 | Hamilton et al. | |
| 10,388,926 B2 | 8/2019 | Tsutsui et al. | |
| 2012/0152586 A1* | 6/2012 | Frutschy | H01M 50/209 |
| | | | 248/220.21 |
| 2015/0079454 A1* | 3/2015 | Maguire | H01M 50/20 |
| | | | 429/159 |
| 2018/0361874 A1* | 12/2018 | Kobayashi | H01M 50/227 |
| 2019/0305265 A1* | 10/2019 | Wynn | H01M 50/24 |

FOREIGN PATENT DOCUMENTS

| | | |
|---|---|---|
| CN | 104466051 A | 3/2015 |
| CN | 206584974 U | 10/2017 |
| CN | 109148759 A | 1/2019 |

* cited by examiner

*Primary Examiner* — Stewart A Fraser
(74) *Attorney, Agent, or Firm* — HALEY GUILIANO LLP

(57) ABSTRACT

A battery system for providing electric power to a vehicle includes an assembly having battery cells. The battery system also includes a shear wall that is arranged along a lateral side of the assembly to provide structural support. The shear wall is two-part, including a first element and a second element, both of which may be formed from sheet metal and welded together. The first element has a first flange extending away from the lateral side of the assembly, and the second element has a second flange. The first flange and the second flange are layered together to form an interface. The flanges are welded together at the interface, proximal to the assembly, to form a resulting flange that is thicker than either individual flange and that may be mounted to a frame member. The battery system may also include another shear wall on the opposite lateral side.

20 Claims, 7 Drawing Sheets

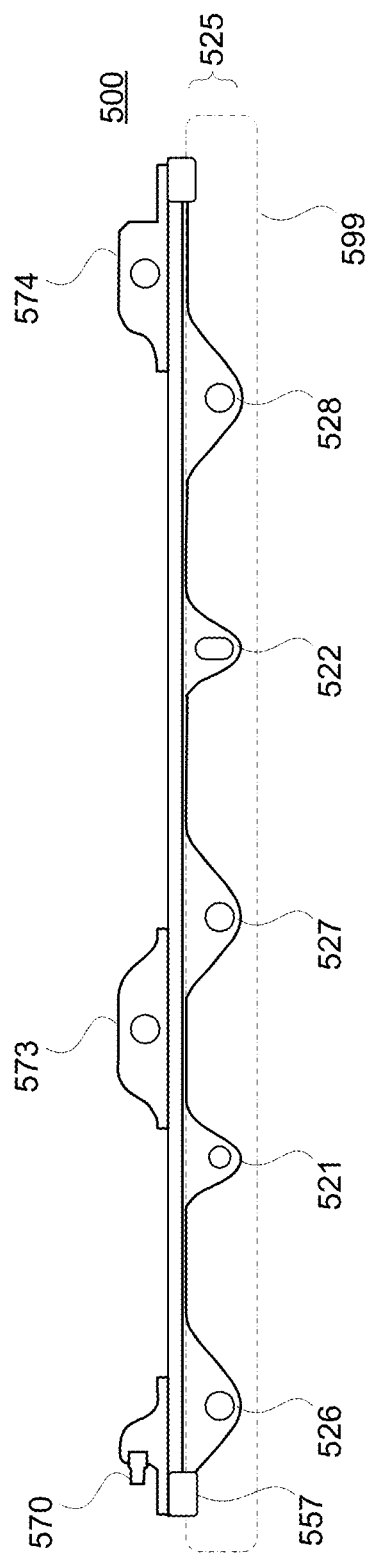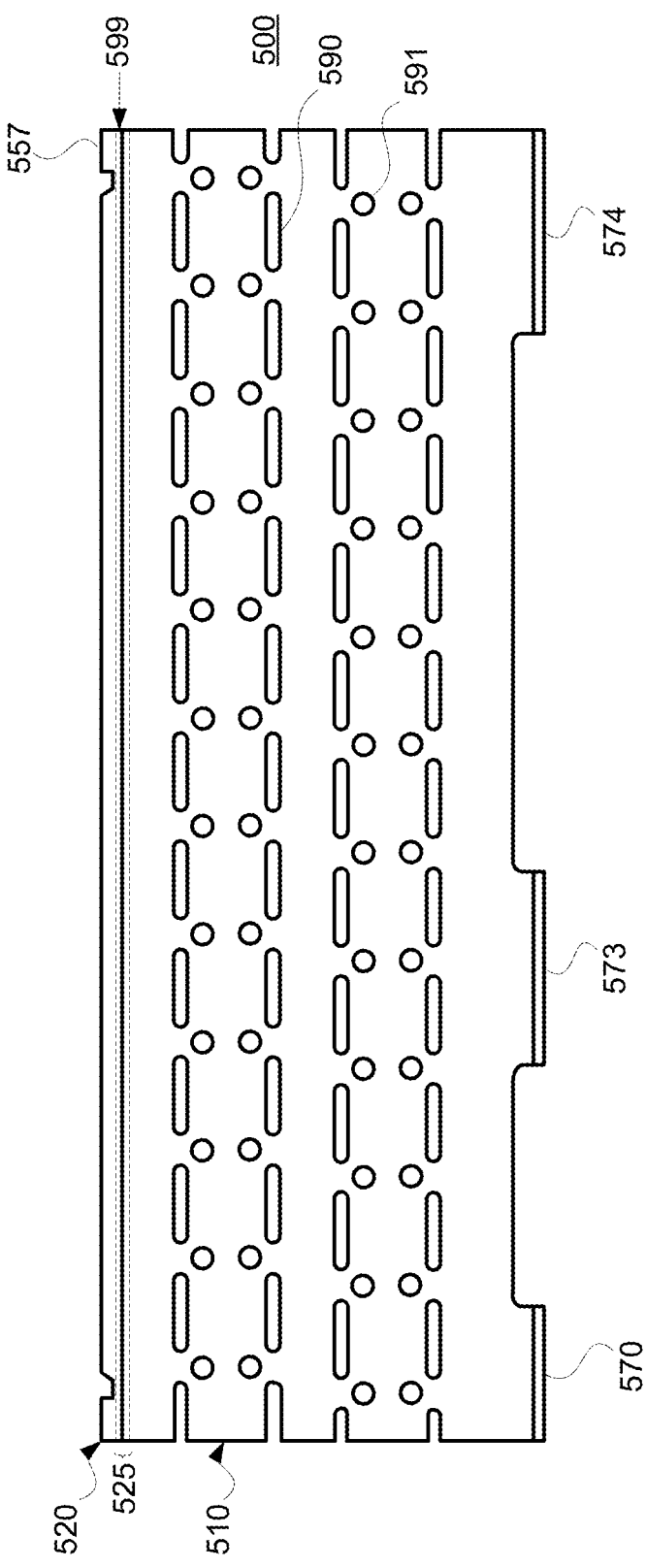
FIG. 7
FIG. 8

MULTI-PART BATTERY MODULE WALL

INTRODUCTION

The present disclosure is directed towards a structural wall of a battery system, and more particularly, towards a multipart shear wall having a layered flange section.

SUMMARY

In some embodiments, the present disclosure is directed to a battery system configured to provide electric power to a vehicle. The battery system includes an assembly and at least one shear wall. In some embodiments, the assembly includes a plurality of battery cells. In some embodiments, the plurality of battery cells are arranged in two modules, which are optionally coupled to a cooling plate to form an assembly. In some embodiments, the battery system includes a plurality of battery cells arranged in an enclosure and coupled to a cooling plate rather than two separate modules. The shear wall includes a first element and a second element, and is arranged along a lateral side of the assembly. In some embodiments, the first element corresponds to a majority of a height of the lateral side. The first element includes a first flange extending away from the lateral side of the assembly. The second element includes a second flange. The first flange and the second flange are layered together to form an interface. A reinforcement may be included to strengthen the flange.

In some embodiments, the first element includes a first material thickness and the second element includes a second material thickness substantially equal to the first material thickness. In some embodiments, a resulting flange formed at the interface has a thickness equal to a sum of the first material thickness and the second material thickness. In some embodiments, the first element and the second element are welded together at the interface along a path proximal to and along the lateral side of the assembly. In some embodiments, at least one of the first element or the second element, or both, includes an electrical terminal for electrically grounding the shear wall (e.g., to a cooling plate, a frame member, or other electrical reference).

In some embodiments, the first flange includes a first through feature for mounting to the vehicle, and a first alignment feature for locating the battery module relative to the vehicle. In some embodiments, the second flange includes a second through feature aligned with the first through feature, and a second alignment feature aligned with the first alignment feature. In some embodiments, the first element includes a third flange arranged at the bottom of the first element that extends underneath the assembly.

In some embodiments, the shear wall is a first shear wall, and the battery system includes a second shear wall arranged along an opposite side of the assembly. In some embodiments, the second shear wall includes a third element and a fourth element. The third element includes a third flange extending away from the opposite side of the assembly, and the fourth element is arranged above the third element. The fourth element includes a fourth flange, and the third flange and the fourth flange are layered together to form another interface.

In some embodiments, the first element includes a plurality of through features configured to accommodate corresponding extensions of the assembly to constrain relative motion between the shear wall and the assembly.

In some embodiments, the present disclosure is directed to a shear wall for a vehicle battery system having an assembly comprising a plurality of battery cells. In some embodiments, the plurality of battery cells is arranged in at least one enclosure on a cooling plate. The shear wall includes a first element and a second element. The first element is configured to be arranged along a lateral side of the assembly. In some embodiments, the first element corresponds to a majority of a height of the lateral side, a majority of surface area of the lateral side, or both. The first element includes a first flange configured to extend away from the side of the assembly. The second element is configured to be arranged above the first element along the lateral side of the assembly. The second element includes a second flange, and the first flange and the second flange are layered together to form an interface.

In some embodiments, the present disclosure is directed to a method for making a shear wall for a vehicle battery system having an assembly having a plurality of battery cells. In some embodiments, the plurality of battery cells is arranged in at least one enclosure on a cooling plate. The method includes forming a first element configured to be arranged along a lateral side of the assembly, forming a second element configured to be arranged above the first element along the lateral side of the assembly, and welding the first element and the second element together along a weld path at the interface. The weld, which may include a stitch weld, for example, is arranged proximal to an interior surface of the shear wall configured to interface with the assembly. In some embodiments, the first element corresponds to a majority of a height of the lateral side, a majority of surface area of the lateral side, or both. The first element includes a first flange that is configured to extend away from the side of the assembly. The second element includes a second flange. The first flange and the second flange are layered together to form an interface.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIG. 7 shows a top view of the illustrative multipart shear wall of FIG. 5, in accordance with some embodiments of the present disclosure;

FIG. 8 shows a side view of the illustrative multipart shear wall of FIG. 5, in accordance with some embodiments of the present disclosure;

DETAILED DESCRIPTION

The present disclosure is directed to structural walls of a battery system and attaching flanges located near the top of the structural walls to one or more frame members of a vehicle. In some embodiments, the battery system hangs (e.g., at least partially) from the flanges. For example, in some embodiments, the battery system need not be supported at the bottom (e.g., because of tolerance and stack up issues). To illustrate, in some circumstances, this hanging arrangement may cause the flanges and shear walls to undergo bending when the vehicle undergoes vertical g-forces. Accordingly, it is desirable to reduce bending in the battery module shear walls. The multipart shear walls of the present disclosure may reduce bending by including, for example, a thicker flange region.

Figure 1:
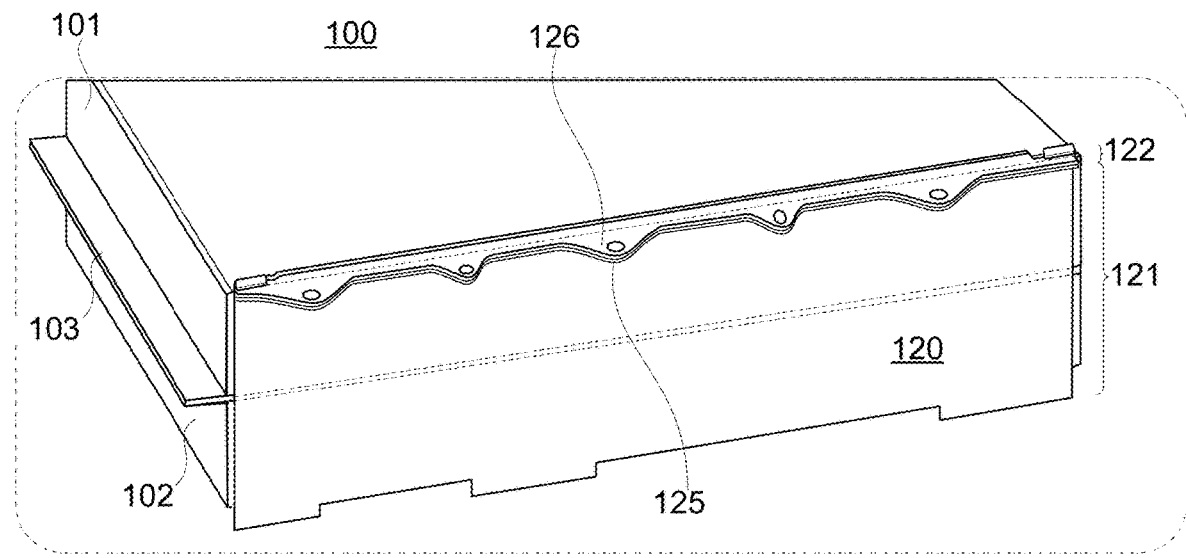
FIG. 1 shows a perspective view from above and a side of an illustrative battery system having a shear wall, in accordance with some embodiments of the present disclosure.
Figure 2:
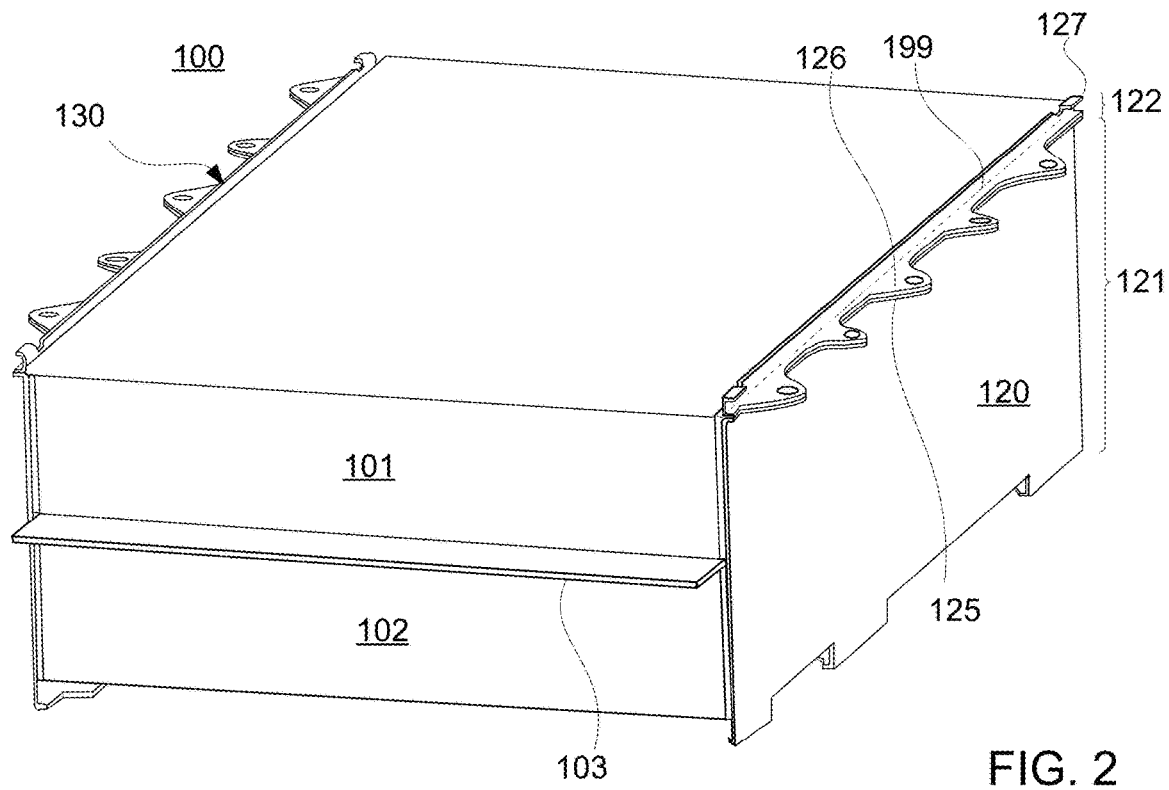
FIG. 2 shows a perspective view from front and above of the illustrative battery system of FIG. 1, in accordance with some embodiments of the present disclosure.
Figure 3:
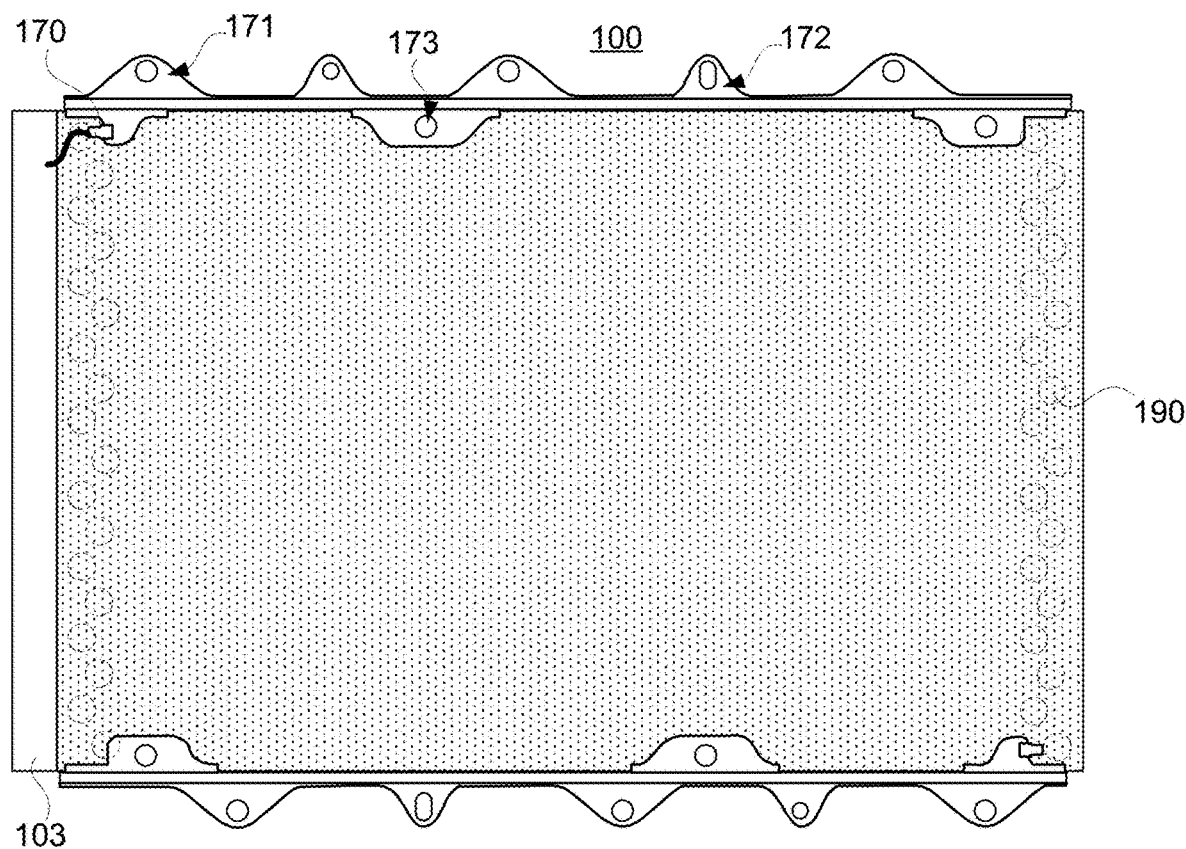
FIG. 3 shows bottom view of the illustrative battery system of FIG. 1, in accordance with some embodiments of the present disclosure.

FIG. 1 shows a perspective view from above and a side of illustrative battery system 100 having shear wall 120, in accordance with some embodiments of the present disclosure. FIG. 2 shows a perspective view from front and above of illustrative battery system 100 of FIG. 1, in accordance with some embodiments of the present disclosure. FIG. 3 shows bottom view of illustrative battery system 100 of FIG. 1, in accordance with some embodiments of the present disclosure. As illustrated, battery system 100 also includes another shear wall 130, arranged on the opposite lateral side from shear wall 120. As illustrated, battery system 100 includes first module 101 (e.g., having a plurality of battery cells), second module 102 (e.g., having a plurality of battery cells, one of which is battery cell 190), and cooling plate 103 to which first module 101 and second module 102 are affixed (e.g., using adhesive). First module 101, second module 102, and cooling plate 103 may be referred to herein as an assembly (e.g., to which shear wall 120 is affixed). As illustrated, some of the plurality of battery cells (e.g., battery cell 190), at opposing ends of second module 102, are shown as dashed circles in FIG. 3 for purposes of illustration (e.g., the plurality of battery cells may extend completely across second module 102, although only some are illustrated in FIG. 3).

Shear wall 120, as illustrated, includes a bottom component (e.g. element 121, which is the main portion of shear wall 120), which includes flange 125. Flange 125, as illustrated, includes extensions that are configured for attachment to a frame member. Flange 125, as illustrated, includes mounting features 171 (e.g., flange 125 includes three as illustrated) and alignment features 172 (e.g., flange 125 includes two as illustrated). Element 121, as illustrated, also includes grounding terminal 170 (e.g., element 121 includes one as illustrated, grounded to cooling plate 103) and secondary module retention features 173 (e.g., element 121 includes two as illustrated). Shear wall 120, as illustrated, also includes a top component (e.g., element 122), which is relatively smaller than element 121 and includes flange 126 having similar mounting and alignment features as flange 125 (e.g., the features of flange 126 align with respective features of flange 125). Accordingly, the resulting flange includes flanges 125 and 126 layered, with through features (e.g., mounting features 171 and alignment features 172). In some embodiments, element 122 includes handling features 127 (e.g., for lifting battery module 100).

Element 121 and element 122 are joined at their respective flanges, flange 125 and flange 126. The resulting flange has a thickness substantially equal to the sum of the thickness of flange 125 and the thickness of flange 126, being equal to the stack-up of the two flanges (e.g., flange 125 and flange 126), which may include the material thicknesses, any thinning (e.g., from pressing together), or any separation (e.g., from non-uniformities of the interfacing surfaces). To illustrate, the resulting flange may be within 5% of the sum of the thickness of flanges 125 and 126. For example, in some embodiments, element 121 and 122 are welded together at multiple weld locations (e.g., along dash-dot line 199 in FIGS. 1-2). To illustrate, element 121 and element 122 may be welded together in linear sections (e.g., one, two, three, or more than three sections). To illustrate further, in some embodiments, elements 121 and 122 are stitch-welded together along a suitable path (e.g., to prevent overheating and distortion while still maintaining sufficient weld penetration). To illustrate further, in some embodiments, elements 121 and 122 are each made of steel such as stainless steel (e.g., 304 or 304L stainless, or any other suitable grade). In some embodiments, the weld locations are spaced apart along the joint between flanges 125 and 126. In some embodiments, a weld seam is used to attach the backside joint between flanges 125 and 126 on the interior side of shear wall 120 (e.g., proximal to the battery cells or enclosure of the battery cells). The resulting flange from layering flanges 125 and 126 has an increased thickness (e.g., a double thickness) compared to a configuration that includes only a single flange (e.g., either flange 125 or flange 126). In an illustrative example, element 121 and element 122 may be welded together at the interface of flanges 125 and 126, along a path proximal to and along a lateral side of the first assembly (dash-dot line 199).

The two-part construction of shear wall 120 may significantly increase the strength of the mounting flange (e.g., the layered assembly of flanges 125 and 126), significantly reduce bending of the mounting flange, or both. In some embodiments, a weld seam along the interior side (e.g., proximal to the batteries) of shear wall 120, where flange 125 and flange 126 meet at an interface, significantly strengthens the joint where elements 121 and 122 come together. For example, the two-layer mounting flange reduces bending in shear wall 120 when the vehicle undergoes vertical accelerations and loadings.

To illustrate, battery system 100 may be configured to provide electric power to a vehicle. In some embodiments, battery system 100 includes a first plurality of battery cells arranged in first module 101, a second plurality of battery cells arranged in second module 102, and cooling plate 103 coupled between first module 101 and second module 102 to form a first assembly. As illustrated, battery system 100 includes shear walls 120 and 130, which are attached to the first assembly on lateral sides of the first assembly. Although two shear walls are illustrated in FIGS. 1-3, a battery system may include one shear wall, two shear walls, or more than two shear walls, in accordance with the present disclosure. Each of shear walls 120 and 130 includes a first element and a second element (e.g., elements 121 and 122 for shear wall 120). The first element (e.g., element 121) is arranged along a lateral side of the first assembly, arranged over a majority of a height of the lateral side, a majority of a surface area of the lateral side, or both. The first element includes a flange (e.g., flange 125) that extends away from the lateral side of the first assembly (e.g., from near the plurality of battery cells outwards). The second element (e.g., element 122) is arranged above the first element along the lateral side of the first assembly, and also includes a flange (e.g., flange 126). The flanges (e.g., flanges 125 and 126) are layered together to form an interface (e.g., where the flanges meet) and a resulting flange (e.g., the layered composite of the two flanges).

Resulting flanges, or the individual flanges thereof (e.g., flanges 125 and 126), may include one or more through features for mounting to the vehicle (e.g., mounting features 171), one or more alignment features for locating the battery module relative to the vehicle (e.g., alignment features 172), one or more retention features (e.g., retention features 173, extending underneath the battery cells), one or more grounding features (e.g., grounding terminal 170), any other suitable features, or any combination thereof.

Figure 4:
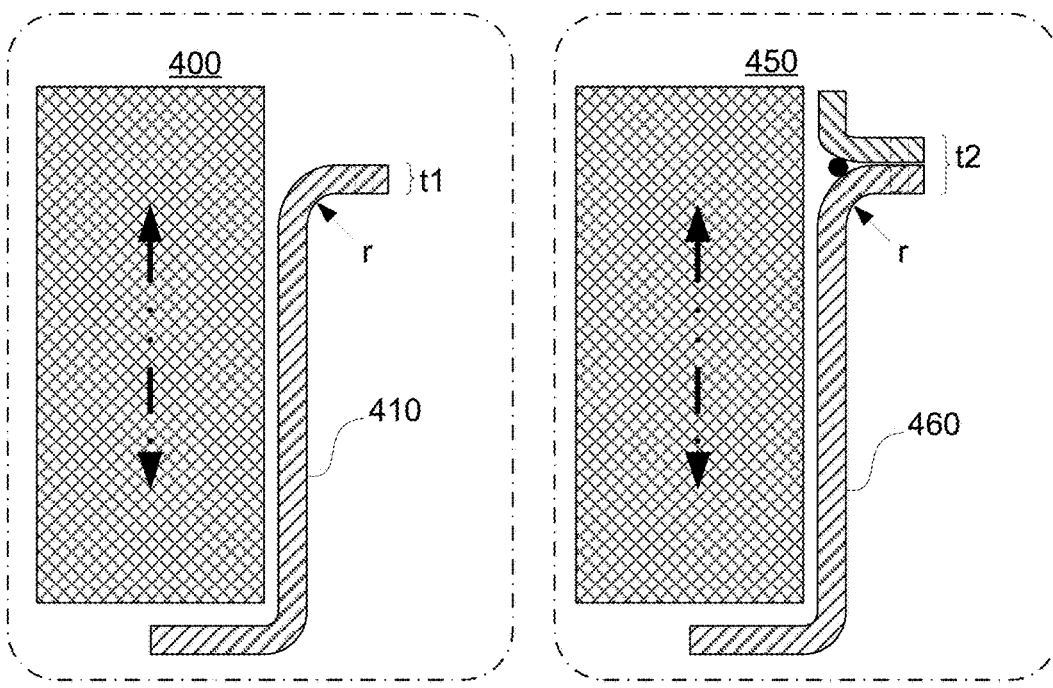
FIG. 4 shows a cross-sectional views of an illustrative battery system having multipart shear wall and an illustrative battery system having a single part shear wall, under loading, in accordance with some embodiments of the present disclosure.

FIG. 4 shows a cross-sectional view of illustrative battery system 450 having multipart shear wall 460 and battery system 400 having single part shear wall 410, under loading, in accordance with some embodiments of the present disclosure. To illustrate, shear wall 410 has a flange thickness of t1 (e.g., the material thickness of sheet material used to form shear wall 410), while shear wall 460 has a flange thickness of t2 (e.g., the sum of material thicknesses of sheet materials used to form the upper and lower elements of shear wall 460).

Figure 5:
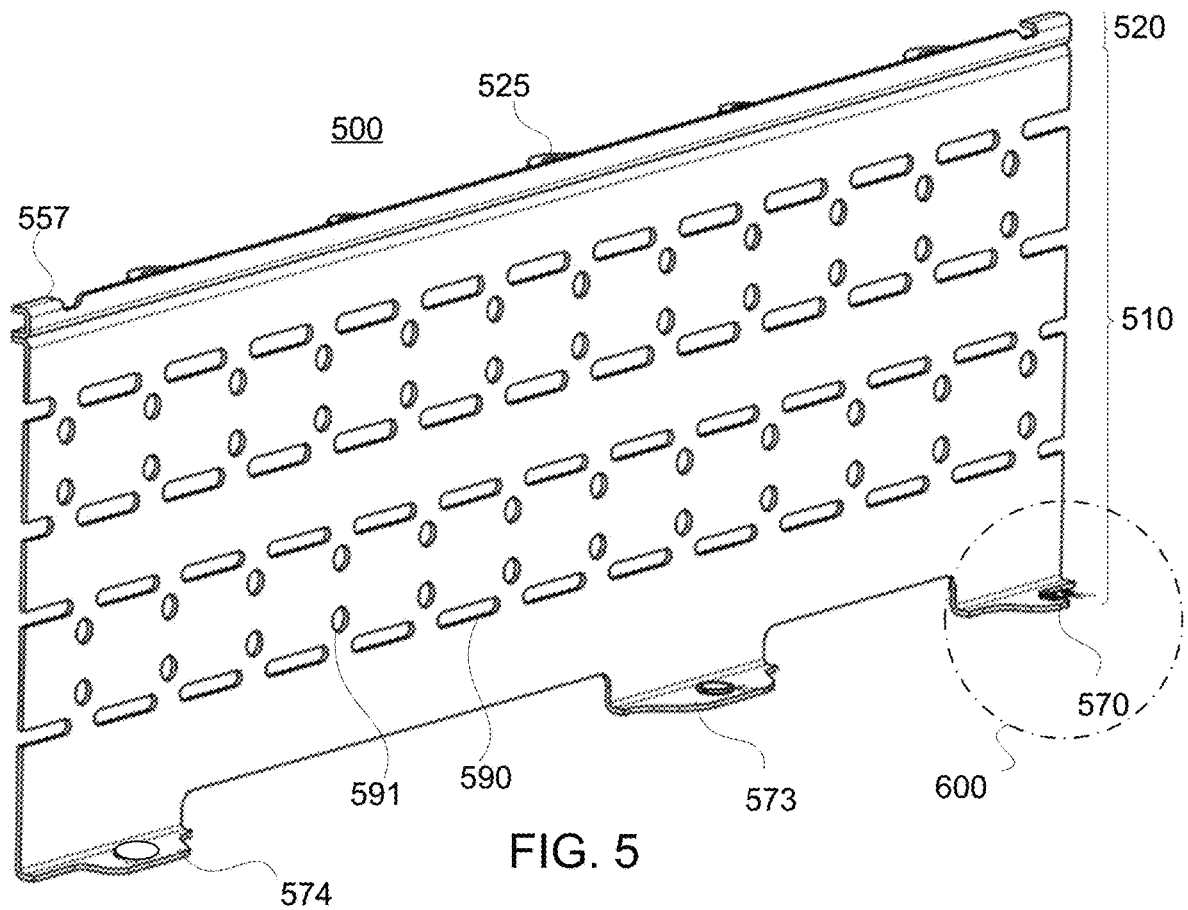
FIG. 5 shows a perspective view of an illustrative multipart shear wall, in accordance with some embodiments of the present disclosure.
Figure 6:
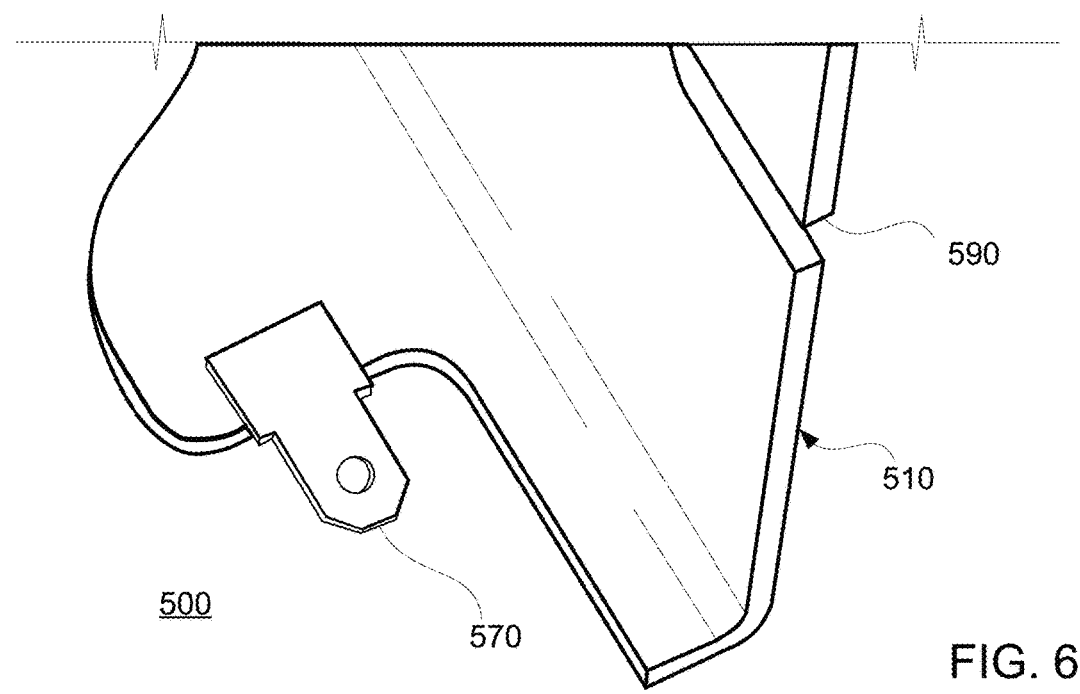
FIG. 6 shows an enlarged perspective view of a portion of the illustrative multipart shear wall of FIG. 5, having a grounding terminal, in accordance with some embodiments of the present disclosure.

In some embodiments, the two-part construction of shear wall 460 results in a flange having double thickness (e.g., t2 is roughly equal to twice t1). The thicker flange of shear wall 460 may reduce flange bending when the vehicle undergoes vertical g-forces, increased strength, increased stiffness, reduce shear wall bending when the vehicle undergoes vertical g-forces (e.g., which reduces stresses inside of the battery module), or a combination thereof. In some circumstances, use of a thicker material may incur a larger bend radius (e.g., radius of curvature "r") during forming, which may affect the resulting geometry. Further, in some circumstances, differing thickness of material between may FIG. 5 shows a perspective view (from the inside face) of illustrative multipart shear wall 500, in accordance with some embodiments of the present disclosure. FIG. 6 shows an enlarged perspective view (from above) of a portion of illustrative multipart shear wall 500 of FIG. 5 (e.g., approximately shown by circle 600), having grounding terminal 570, in accordance with some embodiments of the present disclosure. FIG. 7 shows a top view of illustrative multipart shear wall 500 of FIG. 5, in accordance with some embodiments of the present disclosure. FIG. 8 shows a side view of illustrative multipart shear wall 500 of FIG. 5, in accordance with some embodiments of the present disclosure. To illustrate, shear wall 500 may be the same as, similar to, or different from shear wall 120 of FIGS. 1-3. For example, shear wall 500 may be included in battery system 100 as an example of shear wall 120.

As illustrated, shear wall 500 includes element 510 (e.g., a lower element) and element 520 (e.g., an upper element). Element 510, as illustrated, includes grounding terminal 570 and features 573 and 574, all arranged at the bottom of element 510. For example, grounding terminal 570 may include a feature such as a tab, a hole, a connector (e.g., that may be soldered or welded), or a combination thereof that is configured to be electrically coupled by a cable to another part of a battery system, a frame member of a vehicle, or any other suitable grounded reference. In a further example, features 573 and 574 may include tabs that are bent inwards and configured to fit beneath the battery cells of the battery system. In some embodiments, features 573 and 574 may be affixed to the battery cells or the enclosure surrounding the battery cells. In some embodiments, features 573 and 574 are coupled to a frame member of the vehicle and are constrained from displacement in one or more direction. For example, features 573 and 574 may include tabs with thorough holes that are configured to accommodate a pin affixed to the frame member of the vehicle that constrains lateral displacement of features 573 and 574 (e.g., while optionally allowing vertical displacement) and thus the battery system. As illustrated, element 520 includes lifting feature 557, which may be configured to allow lifting of the battery system (e.g., for processing, maintenance, or installation).

As illustrated, shear wall 500 includes features 590 and features 591. In some embodiments, features 590 are included to accommodate extensions (e.g., pins or other boss features) of the enclosure around the battery cells to prevent relative displacement between shear wall 500 and the rest of the battery system. In some embodiments, shear wall 500 is adhered to the lateral side of the rest of the battery system, with features 590 providing a mechanical backup to, or enhancement of, the adhesive. In some embodiments, features 591 are included to help the adhesive cure by providing, for example, access to air, humidity, ultraviolet irradiation, or a combination thereof from outside of shear wall 500 when installed. In some embodiments, features 590 may be included to reduce the mass of shear wall 500, affect the stiffness of shear wall 500, accommodate other protrusions of the rest of the battery system, or a combination thereof.

As illustrated, elements 510 and 520 meet at interface 599 to form resulting flange 525, which is oriented at substantially a right angle to the rest of elements 510 and 520 (e.g., at 90 degrees to or within a few degrees of 90 degrees), extending outward when shear wall 500 is installed. Elements 510 and 520 may be welded or otherwise affixed together. To illustrate, both element 510 and 520 may be formed from sheet metal, which may be, but need not be, the same thickness. When assembled, flange 525 has a thickness that is equal to the sum of the thicknesses of element 510 and 520 (e.g., although some thinning or thickening may result from bending, forming, and welding the components).

As illustrated in FIG. 7, flange 525 includes features 521, 522, 526, 527, and 528. Feature 521 and feature 522 are configured to aid in aligning shear wall 500 (e.g., to a frame member of a vehicle). As illustrated, feature 521 includes a circular hole and feature 522 include a lateral slot, although either of features 521 and 522 may include a circular hole, an oval hole, a slot, a through polygonal hole, a square through hole, any other suitable feature for aligning or constraining displacement in at least one degree of freedom, or any combination thereof.

Figure 9:
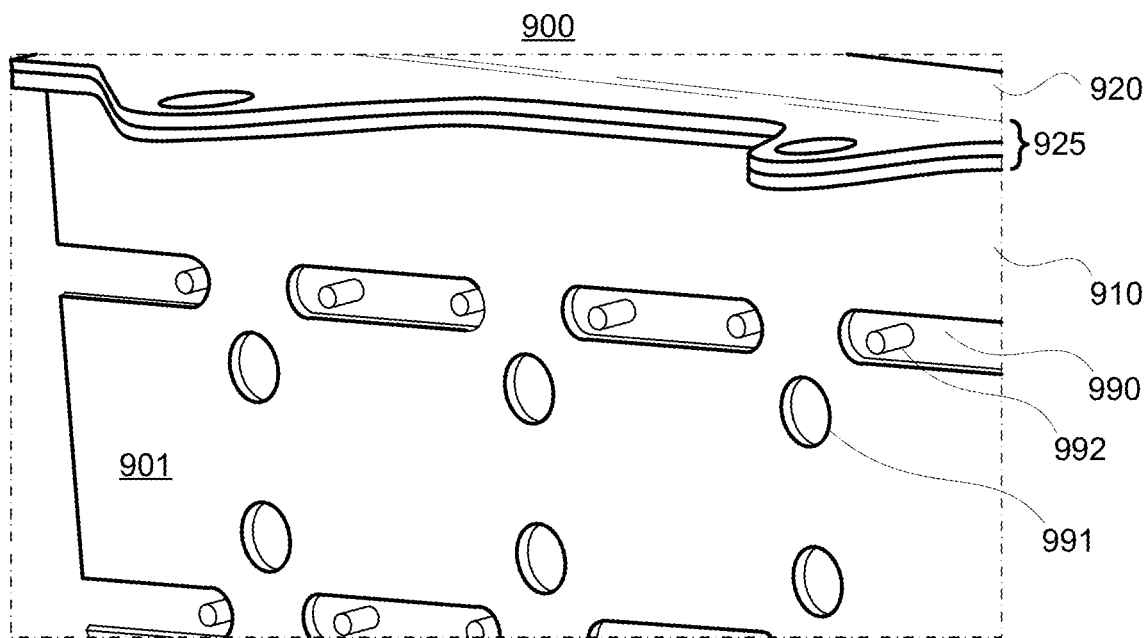
FIG. 9 shows a side perspective view of an illustrative battery system having a multipart shear wall, with mechanical features, in accordance with some embodiments of the present disclosure.

FIG. 9 shows a side perspective view of illustrative battery system 900 having multipart shear wall 901, with mechanical features, in accordance with some embodiments of the present disclosure. Shear wall 901 may be, but need not be, the same as shear wall 500 of FIGS. 5-8, for example. As illustrated, shear wall 901 includes element 910 (e.g., a lower element) and element 920 (e.g., an upper element). Elements 910 and 920 form resulting flange 925, which is oriented at substantially a right angle to the rest of elements 910 and 920 (e.g., at 90 degrees to or within a few degrees of 90 degrees), extending outward from battery cells of battery system 900. As illustrated, element 910 includes features 990 for interlocking with other parts of battery system 900, and features 991 (e.g., for mass reduction, adhesive curing, or accommodating features of battery system 900).

Battery system 900 may include a first assembly that includes one or more battery modules (e.g., battery cells, an enclosure, busbars, current collectors, sensors), a cooling plate (e.g., adhered or otherwise affixed to the one or more battery modules), any other suitable components, or any combination thereof. Shear wall 901 is arranged on a lateral side of the first assembly. Element 910 of shear wall 901 includes plurality of through features 990, which are configured to accommodate corresponding extensions 992 of the first assembly to constrain relative motion between shear wall 901 and the first assembly. For example, extensions 992 include pins extending outward from the first assembly, aligning with features 990 to constrain relative displacement. While illustrated as pins arranged in slots, features 990 and extensions 992 may include any suitable geometry and may engage in any suitable manner to prevent or otherwise constrain relative displacement. For example, extensions 992 may include circular pins, non-circular pins, cones, tabs, any other suitable protrusion, optionally arranged in any suitable array, or any combination thereof.

Figure 10:
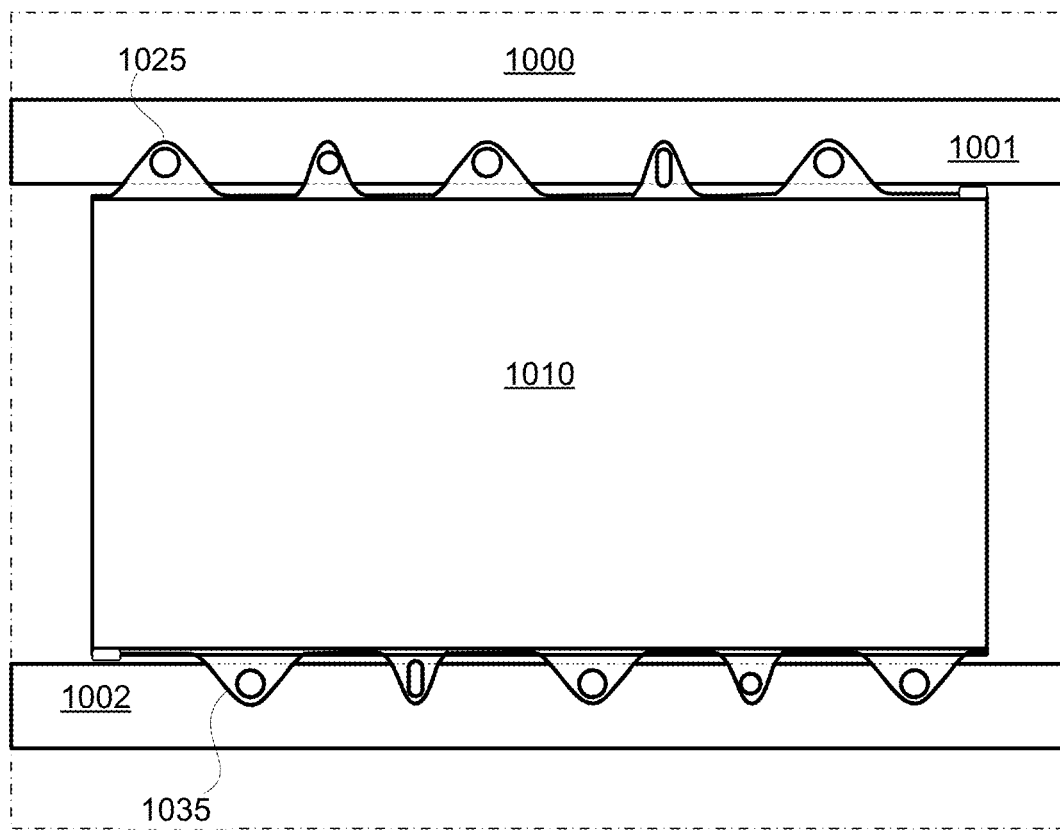
FIG. 10 shows a top view of a portion of an illustrative vehicle having a battery system installed, in accordance with some embodiments of the present disclosure.

FIG. 10 shows a top view of a portion of illustrative vehicle 1000 having battery system 1010 installed, in accordance with some embodiments of the present disclosure. As illustrated, battery system 1010 includes flanges 1025 and 1035, which are coupled to respective frames members 1001 and 1002 of vehicle 1000. For example, battery system 1010 may be lowered into place relative to frames members 1001 and 1002 such that flanges 1025 and 1035 support the weight of battery system 1010 (e.g., battery system 1010 hangs from frame members 1001 and 1002). Flanges 1025 and 1035 may be affixed to respective frame members 1001 and 1002 using fasteners (e.g., bolts), clamps, mechanical interlocks, a press-fit, any other suitable engagement, or any combination. In some embodiments, flanges 1025 and 1035 each include one or more alignment features that are configured to engage with corresponding features of respective frame members 1001 and 1002 to prevent or otherwise constrain relative displacement of battery system 1010 and frame members 1001 and 1002. For example, flanges 1025 and 1035 may include holes, slots, any other suitable through features, pins, tabs, lips, any other suitable boss features, or any combination thereof that are configured to engage with corresponding features of respective frame members 1001 and 1002. In an illustrative example, flanges 1025 and 1035 may each include a circular hole and a slot, which are configured to engage with circular pins of respective frame members 1001 and 1002 to ensure alignment, constrain relative displacement, act as a hard-stop (e.g., if a fastened joint failed), or a combination thereof.

Figure 11:
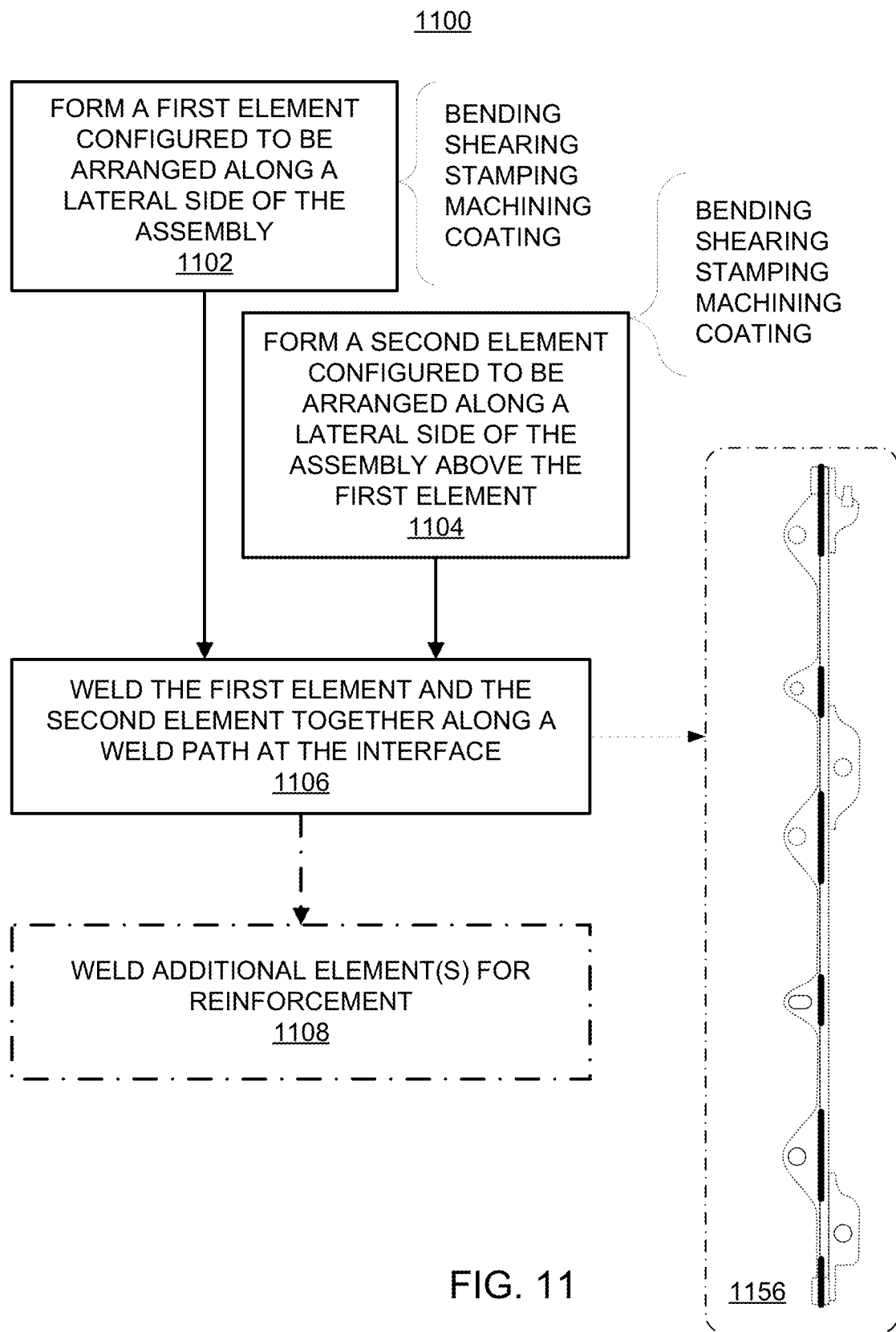
FIG. 11 shows a flowchart of an illustrative process for making a shear wall, in accordance with some embodiments of the present disclosure.

FIG. 11 shows a flowchart of illustrative process 1100 for making a shear wall, in accordance with some embodiments of the present disclosure. In an illustrate example, process 100 may be used to form shear wall 120 of FIGS. 1-3, shear wall 500 of FIGS. 5-8, or both.

Step 1102 includes forming a first element configured to be arranged along a lateral side of an assembly. In some embodiments, step 1102 includes forming the first element to correspond to a majority of a height of the lateral side. In some embodiments, the first element is formed from sheet metal (e.g., sheet steel such as stainless steel) by cutting an outline of sheet metal (e.g., by stamping, shearing, water jet cutting, wire EDM, plasma cutting), stamping through features, bending the sheet metal to form a flange (e.g., using a break or form), drilling hole features, coating the metal, processing the surface (e.g., cleaning, etching, sanding, polishing), performing any other suitable processes, or any combination thereof.

Step 1104 includes forming a second element arranged above the first element along the lateral side of the assembly. The second element includes a second flange that is configured to interface the first flange. In some embodiments, the second element is formed from sheet metal (e.g., sheet steel such as stainless steel) by cutting an outline of sheet metal (e.g., by stamping, shearing, water jet cutting, wire EDM, plasma cutting), stamping through features, bending the sheet metal to form a flange (e.g., using a break or form), drilling hole features, coating the metal, processing the surface (e.g., cleaning, etching, sanding, polishing), performing any other suitable processes, or any combination thereof.

Step 1106 includes welding the first element (e.g., a first sheet metal) and the second element (e.g., a second sheet metal which may be, but need not be the same metal as the first element) together along a weld path at the interface proximal to an interior surface of the shear wall configured to interface with the assembly. In some embodiments, the first flange and the second flange are layered together to form an interface. In some embodiments, step 1106 includes stitch welding the first and second elements together along a suitable path at the interface to prevent overheating and distortion while still maintaining sufficient weld penetration. Panel 1156 shows an illustrative shear wall having two elements stitch welded together (e.g., as illustrated by the thicker, unbroken lines). As illustrated, the weld segments are located proximate to the mounting and alignment flange features. For example, the weld segments may each be centered behind a corresponding feature to provide increased strength to the feature. Any suitable welding technique may be used to join the first and second elements together. In some embodiments, the weld does not extend out into the flange portions that extend away from the shear wall face. For example, this may help prevent or otherwise limit internal stresses in the resulting flange (e.g., from over-constraint). Step 1106 may include, for example, laser welding (e.g., laser stitch welding), TIG welding, arc welding, friction welding, any other suitable welding technique, or any combination thereof. In some embodiments, step 1106 need not include welding, and may include for example, mechanically interlocking the elements, adhering the elements, or a combination thereof.

Step 1108 includes welding or otherwise affixing one or more reinforcements to the first element, second element, or both. Step 1108 may be optional, and need not be performed in some embodiments. For example, a shear wall may be created using steps 1102-1106, or steps 1102-1108. Step 1108 may include, for example, welding (e.g., laser welding), or otherwise affixing, one or more additional elements (e.g., reinforcement elements) to the assembly of the first and second elements. In some embodiments, the one or more additional elements are formed from sheet metal, optionally having the same thickness as either the first or second element, or both. In some embodiments, for example, the first element, the second element, and the additional element(s) have the same thickness. In some embodiments, for example, the first element, the second element, and an additional element form a flange having a stacked cross-section. In some such embodiments, the top layer (e.g., the second flange) and the bottom layer (e.g., the additional flange) have the same or similar thicknesses, and are each thicker than the intermediate layer (e.g., the first flange).

Figure 12:
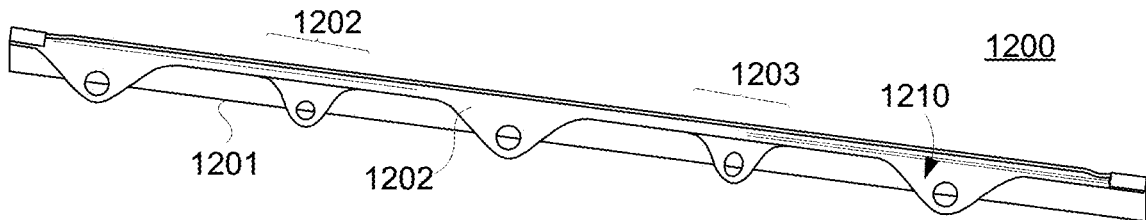
FIG. 12 shows a perspective view from above of a shear wall with differing flanges, in accordance with some embodiments of the present disclosure.

FIG. 12 shows a perspective view from above of shear wall 1200 with differing flanges, in accordance with some embodiments of the present disclosure. Shear wall 1200, as illustrated, includes element 1201 and element 1202. Resulting flange 1210 is formed by a stack-up of portions (e.g., flange portions) of elements 1201 and 1202, which are layered parallel along a portion of resulting flange 1210. The flange portions of elements 1201 and 1202 differ in that element 1202 does not include corresponding features as aligning features 1202 and 1203 of element 1201, although the rest of the flange portions overlap. A resulting flange may include any suitable combination of features, with flange portions overlapping in any suitable manner, in accordance with the present disclosure.

Figure 13:
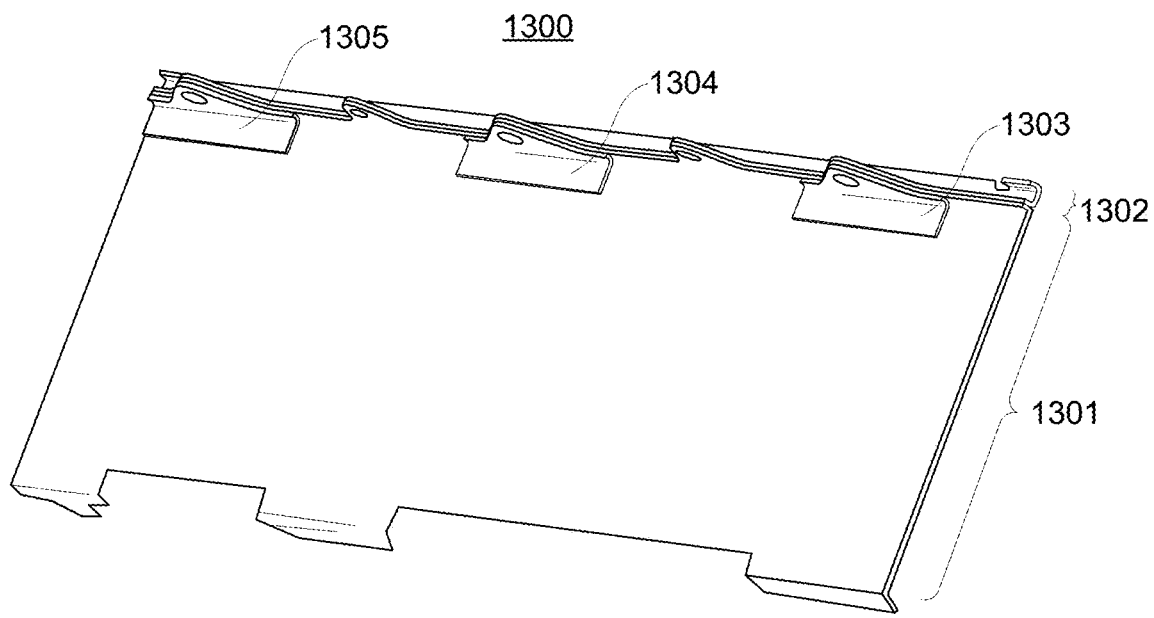
FIG. 13 shows a perspective view from below of a shear wall with reinforcing elements, in accordance with some embodiments of the present disclosure.

FIG. 13 shows a perspective view from below of shear wall 1300 with reinforcing elements 1303, 1304, and 1305, in accordance with some embodiments of the present disclosure. As illustrated, shear wall 1300 includes element 1301, element 1302, and reinforcing elements 1303. 1304, and 1305. Reinforcing elements 1303, 1304, and 1305 may be welded to element 1301 (as illustrated), element 1302, or both to provide stiffness to a resulting flange formed by elements 1301-1305. Although illustrated as having three reinforcing elements in FIG. 13, a shear wall may include any suitable number of elements. For example, in some embodiments, a single reinforcing element may be included that extends the length of the resulting flange. In some embodiments, for example, reinforcing elements 1303-1305 are welded to element 1301 to provide stiffness to the resulting flange.

Figure 14:
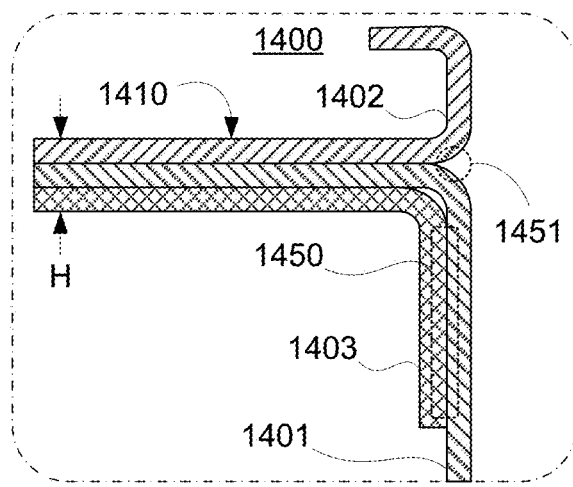
FIG. 14 shows a side cross-sectional view of a resulting flange of a shear wall, in accordance with some embodiments of the present disclosure.

FIG. 14 shows a side cross-sectional view of resulting flange 1410 of shear wall 1400, in accordance with some embodiments of the present disclosure. Shear wall 1400, as illustrated, includes element 1401, element 1402, and element 1403. Resulting flange 1410 is formed by a stack-up of portions (e.g., flange portions) of elements 1401-1403, which are layered parallel to a mounting surface. The flange portions of elements 1401-1403 may be identical, similar, or may differ in one or more features. For example, a flange portion may include a first set of mounting holes and a second set of aligning holes. At least one other flange portion need not include all of the first and second set of holes (e.g., at least one flange portion need not include aligning features). Each of elements 1401-1403 includes a material thickness (e.g., arising from the gage of sheet metal used to from the element). In some embodiments, the thickness of each of elements 1401-1403 is the same, and resulting flange 1410 is up to 3x as thick (e.g., as illustrated) as the thickness of any of elements 1401-1403, depending on overlap of the flange portions. In some embodiments, the thickness of one or both of elements 1402 and 1403 are thicker than element 1401, and resulting flange is equal to the thickness of the local stack-up of flange portions (e.g., the flange portions need not be the same shape and need not stack up in all locations). During assembly, elements 1401 and 1402 may be affixed (e.g., welded) in region 1451 (dotted region in FIG. 14), while element 1403 may be affixed (e.g., welded) to element 1401 in region 1450 (dotted region in FIG. 14).

Figure 15:
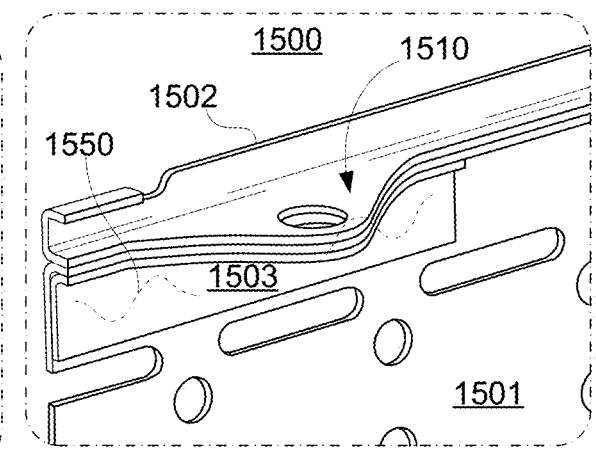
FIG. 15 shows a perspective view from above of a portion of a shear wall having a reinforcement element, in accordance with some embodiments of the present disclosure.

FIG. 15 shows a perspective view from above of a portion of shear wall 1500 having reinforcement element 1503, in accordance with some embodiments of the present disclosure. Shear wall 1500, as illustrated, includes element 1501, element 1502, and reinforcement element 1503. Resulting flange 1510 is formed by a stack-up of portions (e.g., flange portions) of elements 1501-1503, which are layered parallel to from a mounting surface in some locations (e.g., at a mounting feature having a through hole). The flange portions of elements 1501-1503, as illustrated, are similar except that the flange portion of reinforcement element 1503 does not extend the length of resulting flange 1510, and thus resulting flange 1510 has varying thickness. Each of elements 1501-1503 includes a similar material thickness (e.g., arising from the gage of sheet metal used to from the element). For example, the thickness of each of elements 1501-1503 is the same, and resulting flange 1510 is up to 3x as thick as the thickness of any of elements 1501-1503 in some locations (e.g., at the mounting feature). As illustrated, reinforcement element 1503 is welded to element 1501 along path 1550 (e.g., two sections are illustrated by dot-dash lines).

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A battery system configured to provide electric power to a vehicle, the battery system comprising:
    an assembly comprising a plurality of battery cells; and
    a shear wall arranged along a lateral side of the assembly, wherein the shear wall comprises:
        a first element comprising a first flange extending away from the lateral side of the assembly, and
        a second element comprising:
            a second flange, wherein the first flange and the second flange are layered together to form an interface; and
            a lifting feature comprising a C-shaped structure having a central portion that extends vertically away from the interface and two end portions that extend laterally away from the central portion.

2. The battery system of claim 1, wherein the first element comprises a first material thickness, wherein the second element comprises a second material thickness, and wherein a resulting flange formed at the interface comprises a thickness equal to a sum of the first material thickness and the second material thickness.

3. The battery system of claim 1, wherein:
the first element and the second element are welded together at a backside of the interface along a path proximal to and along the lateral side of the assembly;
the lifting feature comprising the C-shaped structure is a first lifting feature;
the battery system further comprises a second lifting feature; and
the first lifting feature and the second lifting feature are arranged at opposite ends of the second element.

4. The battery system of claim 1, wherein the first flange comprises:
a first through feature for mounting to the vehicle; and
a first alignment feature for locating a battery assembly relative to the vehicle.

5. The battery system of claim 4, wherein the second flange comprises:
a second through feature aligned with the first through feature; and
a second alignment feature aligned with the first alignment feature.

6. The battery system of claim 1, wherein the first element comprises a third flange arranged at the bottom of the first element and extending underneath the assembly.

7. The battery system of claim 1, wherein the first element comprises an electrical terminal for electrically grounding the shear wall.

8. The battery system of claim 1, wherein the assembly further comprises:
at least one module comprising the plurality of battery cells arranged in at least one enclosure; and
a cooling plate coupled to the enclosure, wherein the shear wall is electrically coupled to the cooling plate.

9. The battery system of claim 1, wherein the shear wall is a first shear wall, and wherein the battery system comprises a second shear wall arranged along an opposite side of the assembly, wherein the second shear wall comprises:
a third element comprising a third flange extending away from the opposite side of the assembly; and
a fourth element arranged above the third element, wherein the fourth element comprises a fourth flange, and wherein the third flange and the fourth flange are layered together to form another interface.

10. The battery system of claim 1, wherein the first element comprises a plurality of through features configured to accommodate corresponding extensions of the assembly to constrain relative motion between the shear wall and the assembly.

11. A shear wall for a vehicle battery system having an assembly comprising a plurality of battery cells arranged in at least one enclosure, the shear wall comprising:
a first element configured to be arranged along a lateral side of the assembly, wherein the first element comprises a first flange configured to extend away from the side of the assembly; and
a second element configured to be arranged above the first element along the lateral side of the assembly, wherein:
the second element comprises a second flange and a lifting feature comprising a central portion connecting first and second bends, and
the first flange and the second flange are layered together to form a multi-layer mounting flange and an interface, wherein the first flange and the second flange are joined at the interface by a weld seam along a backside of the interface.

12. The shear wall of claim 11, wherein:
the first element comprises a first material thickness,
the second element comprises a second material thickness,
the lifting feature is comprised of a C-shaped structure,
the weld seam faces the lateral side of the assembly, and
a resulting flange formed at the interface comprises a thickness equal to a sum of the first material thickness and the second material thickness.

13. The shear wall of claim 11, wherein:
the weld seam does not extend out into a portion of the interface that extends away from the lateral side of the assembly, and
the first and second flanges extend laterally away from the weld seam.

14. The shear wall of claim 11, further comprising at least one reinforcement element arranged adjacent to at least one element of the first element or the second element, and wherein the at least one reinforcement element is welded to the at least one element of the first element or the second element.

15. The shear wall of claim 11, wherein the first flange comprises:
a first through feature for mounting to a frame member; and
a first alignment feature for locating a battery assembly relative to the frame member.

16. The shear wall of claim 15, wherein the second flange comprises:
a second through feature aligned with the first through feature; and
a second alignment feature aligned with the first alignment feature.

17. The shear wall of claim 11, wherein the first element comprises a third flange configured to be arranged at the bottom of the first element and extending underneath the assembly.

18. The shear wall of claim 11, wherein the first element comprises an electrical terminal for electrically grounding the shear wall.

19. The shear wall of claim 11, wherein the first element comprises a plurality of through features configured to accommodate corresponding extensions of the assembly to constrain relative motion between the shear wall and the assembly.

20. A method for making a shear wall for a vehicle battery system having an assembly comprising a plurality of battery cells arranged in at least one enclosure, the method comprising:
forming a first element configured to be arranged along a lateral side of the assembly, wherein the first element comprises a first flange extending away from the side of the assembly;
forming a second element configured to be arranged above the first element along the lateral side of the assembly, wherein:
the second element comprises a second flange and a C-shaped lifting feature comprising a central portion that extends vertically away from an interface between the first flange and the second flange and two end portions that extend laterally away from the central portion, and
the first flange and the second flange are layered together to form the interface; and
welding the first element and the second element together to form a multi-layer mounting flange, wherein:

a weld path joining the first element and the second element is along a backside of the interface and proximal to an interior surface of the shear wall configured to interface with the assembly, a weld seam along the weld path faces the lateral side of the assembly and does not extend out into a portion of the interface that extends away from the lateral side of the assembly, and the first and second flanges extend laterally away from the weld seam.

* * * * *